F. W. TULLY.
CULINARY UTENSIL.
APPLICATION FILED MAR. 29, 1917.
1,301,197.
Patented Apr. 22, 1919.
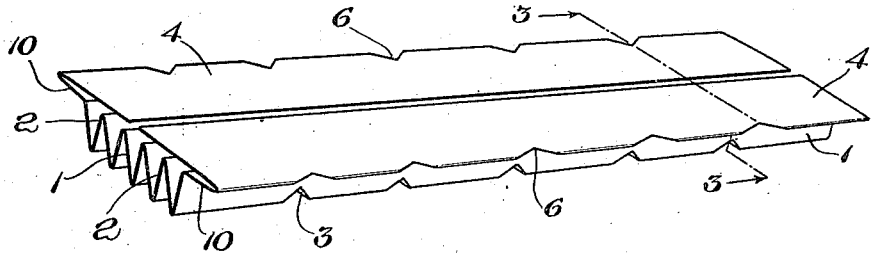
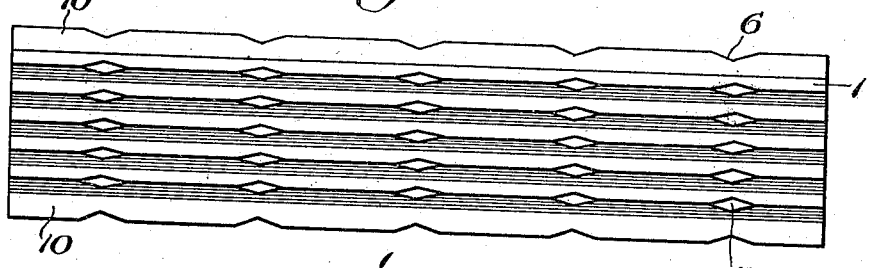
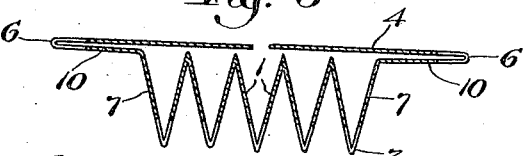
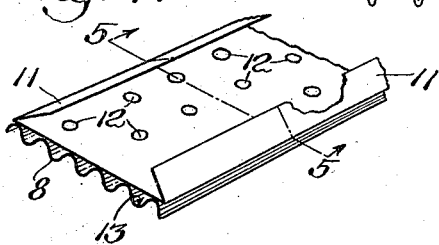
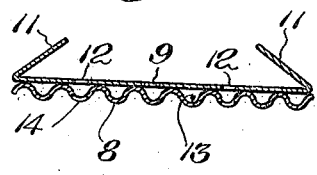
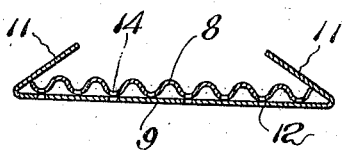
Inventor:
Francis W. Tully,
by Roberts Roberts Cushman
Attorneys.

UNITED STATES PATENT OFFICE.

FRANCIS W. TULLY, OF BROOKLINE, MASSACHUSETTS.

CULINARY UTENSIL.

1,301,197.  Specification of Letters Patent.  Patented Apr. 22, 1919.

Application filed March 29, 1917. Serial No. 158,438.

*To all whom it may concern:*

Be it known that I, FRANCIS W. TULLY, a citizen of the United States, and resident of Brookline, in the county of Norfolk and State of Massachusetts, have invented new and useful Improvements in Culinary Utensils, of which the following is a specification.

This invention relates to a culinary utensil and more particularly to a utensil made of paper or the like and adapted to be used both for dispensing and for baking, broiling or otherwise treating food and the like. In one aspect the invention comprises an improvement in the art known as paper-bag cookery, but instead of making the utensil in the form of a bag I preferably make it in the form of a rack particularly adapted to bake sausage, bacon, and the like.

Heretofore, foods of the character referred to have usually been cooked in a pan or skillet wherein the fatty and other liquids accumulate and partially submerge the food. It has been realized that this is an unsatisfactory manner of preparing such foods, and many expedients have been resorted to for the purpose of overcoming the objectionable features of the method. However, the proposed remedies have been inconvenient and often expensive.

The principal objects of my invention are to provide means for cooking food in an even, clean and appetizing manner, and for baking sausage, bacon and the like in such manner that the fatty and other liquids are removed from the food as it is cooked out, and to provide a cooking utensil of paper or the like which is inexpensive to construct and convenient to use and which is adapted to be used not only as a cooking utensil but also if desired for dispensing purposes and for serving the food.

Other objects of the invention, such as forming the article from a single piece of material and shaping it in such manner that it may be folded or nested into compact form, will be apparent from the following detailed description and the accompanying drawings, in which,—

Figure 1 is a perspective view of one embodiment of the invention;

Fig. 2 is a bottom plan view of the embodiment shown in Fig. 1;

Fig. 3 is a vertical transverse cross-section on line 3—3 of Fig. 1;

Fig. 4 is a perspective view of another embodiment of the invention, parts being broken away;

Fig. 5 is a vertical transverse section taken on line 5—5 of Fig. 4; and

Fig. 6 is a sectional view of a further modification.

The specific forms of my invention illustrated in Figs. 1, 2 and 3 comprises a food-supporting section 1 consisting of a plurality of folds adapted to be extended horizontally and adapted to support food upon the ridges 2 thereof. While all of these folds need not have the same vertical dimension, they are preferably made of the same height, as shown in the drawings. As above stated, it is desirable to provide means to drain off the liquids when employing the device to cook certain foods, and for this purpose I preferably provide openings in the form of notches 3 in the lower portions of the folds 1, although the channels formed between the folds may, if desired, be employed to perform this function. When employing openings such as notches 3, they are preferably formed so as to extend upwardly a short distance into the vertically disposed portions of the folds so that they will not be closed when the utensil is rested upon a flat surface.

In order to cover the food either before it is cooked, while it is cooking or after it has been cooked, wings or flaps 4 are preferably provided. While these wings may be formed separately from the food supporting portion of the utensil, they are preferably formed integrally with the portion 1 as shown in Figs. 1 and 3. Obviously, instead of employing two wings, one disposed at either side of the food-supporting portion, a single wing of sufficient size to cover the entire lower portion of the utensil may be mounted at one side of the device. I preferably provide notches 6 along the folding edges of the wings or flaps 4 for the twofold purpose of facilitating the folding of the wings and for assisting in drainging off the liquid. The particular vessel shown in Figs. 1, 2 and 3 is more particularly adapted to cook bacon and it will be apparent that the device may be modified for cooking more bulky food such as sausage by providing a larger space between the folds and the wings. This may be accomplished in any suitable manner, as for example by extending the outer portions 7 of the folds somewhat higher than the intermediate portions or by bending the wing portions 4 through angles of 90° or by making the folds shown in Figs. 1 and 3 less sharp.

The embodiment of the invention shown in Figs. 4 and 5 comprises a corrugated member 8 and a substantially flat member 9 disposed thereupon, the member 9 preferably being provided with suitable wings 11, as above described. For the purpose of draining the utensil openings 12 are provided in the member 9, and the liquid passing through these openings may then flow either along the channels 13 formed by the corrugations to the end of the utensil, or through the openings 14 in the lower portions of the corrugations. In this embodiment the food rests on the irregular member 8, indirectly through the medium of member 9 instead of directly as in the embodiment shown in Figs. 1, 2 and 3. In Figs. 4 and 5 I have illustrated a form of the device in which the increased thickness produced by the irregularities in the food-supporting portion is relatively slight, thereby rendering the device somewhat less bulky without impairing its utility for most purposes, and it is to be understood that the folds in the construction shown in Figs. 1 and 2 may, if desired, be made of relatively small vertical dimensions. When the device is so constructed as to have a relatively small depth it is particularly well adapted to be used as a dispensing vessel, for example, as a sanitary package in which food may be wrapped for delivery to a customer.

The embodiment of the invention shown in Fig. 6 resembles the embodiment shown in the preceding figures, in that it has a food-supporting portion 14 and perforated irregularities 16 provided therein. However, instead of irregularities being in the form of folds or corrugations they are in the form of knobs or bosses extending downwardly from the bottom 14 of the vessel, these depressions being provided with slots or other openings 17 extending upwardly somewhat along the sides of the depressions. As shown in Fig. 6, other openings such as the circular perforations 18 or the slots 19 may if desired be provided in addition to the perforations in the depressions. Moreover, in Fig. 6 I have illustrated my invention as being applied to a cup or dish-shaped vessel resembling the ordinary type of cooking utensil.

Fig. 6 I have illustrated an embodiment of the invention which is the same as that shown in Figs. 4 and 5 except that the flat portion 9 having perforations 12 and flaps 11 is disposed beneath the corrugated portion 8 with the flaps extending around and above the corrugated portion. This arrangement eliminates the necessity of securing the two portions together and affords an exceedingly compact and convenient utensil which is particularly adapted for dispensing purposes and for broiling food with heat from above. The embodiment of Fig. 6 resembles that of Figs. 1, 2 and 3 in that the food rests directly on the folded or corrugated portion, the folds of Figs. 1, 2 and 3 being species of corrugations.

A characteristic feature of my invention is that it is peculiarly applicable to utensils constructed of paper or paper-like material, and I prefer to construct my improved utensil of such material, the material being of such character as to be grease and water proof and adapted to withstand the ordinary oven temperatures without charring. I employ the term "paper" in the generic sense, intending to include ordinary paper comprising a substance consisting essentially of cellulose fibers interwoven into a compact web or leatheroid, comprising a material made by treating vegetable fiber with certain chemicals and having qualities resembling those of leather or papier mâché, consisting of a tough material made from pulped paper or from paper pulp containing an admixture of sized paste, oil, resin or other substances or from sheets of paper pressed together, or other suitable type of paper material, but I preferably make the utensils of so-called glacine paper.

The modes of operation and various uses of my improved utensil are as follows: The device shown in Figs. 1 and 2 is preferably sold in folded form, that is, the folds 1 are compressed together, the lateral portions 10 are folded downwardly along the side portions 7 and with the flaps 4 lying in parallel relationship with the folds 7. When using the article for dispensing purposes the wings 4 are swung outwardly, the food placed within the vessel and the wings folded over the food. It may then be wrapped and delivered in a neat and attractive manner. When the food is to be cooked the flaps are open a sufficient amount to allow an even and rapid baking of the food, and after the food is properly cooked the flaps are again closed until the food is served, and if desired the food may be served in the utensil itself, in which case the heat is retained by the food for a considerable period of time.

I claim:

1. A culinary utensil composed of flexible paper-like material adapted to withstand heat at cooking temperatures, the utensil having a corrugated bottom portion provided with drip openings, and a flat portion having lateral extensions relative to said corrugated portion, as to permit said lateral extensions to be flexed and folded over the corrugated portion and the food on the utensil.

2. A culinary utensil composed of flexible paper-like material adapted to withstand heat at cooking temperatures, the utensil having a corrugated portion forming the bottom of the utensil and a perforated portion disposed along one side of the corrugated portion, one of said portions having lateral extensions adapted to be flexed and folded over the two portions.

3. A paper culinary utensil comprising an integral member having a food-supporting portion with perforated depressions therein, and having one or more lateral extensions adapted to be folded over the food-supporting portion, the openings in said depressions serving to drain liquid from the food.

Signed by me at Boston, Massachusetts, this 21st day of March, 1917.

FRANCIS W. TULLY.

Copies of this patent may be obtained for five cents each, by addressing the "Commissioner of Patents, Washington, D. C."